(12) United States Patent
Jigamian (10) Patent No.: US 9,353,936 B2
(45) Date of Patent: May 31, 2016

(54) LOCKING PIN FOR A T-RAIL MOUNT FOR A PORTABLE LIGHT AND MOVABLE, LOCKABLE HANDLES FOR THE SAME

(71) Applicant: Surefire LLC, Fountain Valley, CA (US)

(72) Inventor: Gregory Z. Jigamian, Temecula, CA (US)

(73) Assignee: Surefire LLC., Fountain Valley, CA (US)

( * ) Notice: Subject to any disclaimer, the term of this patent is extended or adjusted under 35 U.S.C. 154(b) by 214 days.

(21) Appl. No.: 14/328,627

(22) Filed: Jul. 10, 2014

(65) Prior Publication Data

US 2016/0010837 A1    Jan. 14, 2016

(51) Int. Cl.
*F21V 21/40*    (2006.01)
*F16B 39/10*    (2006.01)

(52) U.S. Cl.
CPC ............... *F21V 21/406* (2013.01); *F16B 39/10* (2013.01)

(58) Field of Classification Search
CPC .............................. F21V 21/406; F16B 39/10
See application file for complete search history.

(56) References Cited

U.S. PATENT DOCUMENTS

| 2,177,865 | A | * | 10/1939 | Collon | F16B 39/10 411/128 |
| 2,225,132 | A | * | 12/1940 | Seaman | B60B 3/14 301/35.624 |
| 2011/0296982 | A1 | * | 12/2011 | Dille | F16B 39/103 92/165 PR |
| 2012/0300438 | A1 | * | 11/2012 | Tarter | F21L 4/00 362/157 |

* cited by examiner

*Primary Examiner* — Mary Ellen Bowman
(74) *Attorney, Agent, or Firm* — Daniel L. Dawes; Marcus C. Dawes (57) ABSTRACT

A locking pin for a mount for receiving a T-rail includes a bolt for engagement with the mount, a plurality of facets defined on the bolt, and a locking leaf spring having a first end fixed to the mount and a second distal end with a planar lip. A movable and lockable handle for a portable light includes a hand grip, a pair of arms and a pair of hinges. A locking flange in the hinge securely captures the arm in a folded configuration. The arm is moved out from behind the locking flange and rotated to a fully deployed configuration and held by a detent flange. The handle is attached to the mount provided with the locking pin.

20 Claims, 7 Drawing Sheets

LOCKING PIN FOR A T-RAIL MOUNT FOR A PORTABLE LIGHT AND MOVABLE, LOCKABLE HANDLES FOR THE SAME

BACKGROUND

1. Field of the Technology

The disclosure relates to the field of locking pins and handles for portable lights.

2. Description of the Prior Art

Portable search lights for military or law enforcement applications are configured for both mounting to a gun or vehicle and then to be detached and hand carried and manipulated. In order provide the needed robustness and strength in the mounted configuration the handles for carrying the light have been rigid or cantilevered arms extending from the light. An example is shown in U.S. Pat. No. 8,613,534 which is incorporated herein by reference. It seemed as if the mounting and carrying systems could be optimize for either gun or vehicular mounting or for manual usage, but not both.

What is needed is some kind of a mounting and carrying system which provide a more convenient and compliant form for manual handling, carrying and stowage, but without any loss of the robustness and strength for mounting to a gun or vehicle, yet which still allows for the quick and easy conversion between these two usages without any compromise to the utility of the system in either usage.

BRIEF SUMMARY

The illustrated embodiments of the invention include a locking pin for a mount for receiving a T-rail. The locking pin includes a bolt for disposition into and engagement with the mount for capturing the T-rail in the mount, a plurality of facets defined on the bolt, and a locking leaf spring having a first end fixed to the mount and a second distal end with a planar lip. The bolt contacts the lip and depresses the leaf spring as the bolt is advanced into the mount until the lip and one of the plurality of facets have sufficient clearance between the facet and lip to allow the leaf spring to clear the bolt. The leaf spring is then released from its interference fit with the bolt so that the lip and facet are juxtaposed parallel to each other. When the lip and facet of the bolt are in a mutually parallel configuration they are in an interference fit which prevents further rotation of the bolt and hence prevents the bolt from being removed from the mount.

The bolt preferably has an octagonal bolt head on which the plurality of facets are defined, but may include any number of facets and need not include a bolt head.

The bolt is threaded and a threaded bore hole is defined in the mount for receiving the bolt. However, it is to be understood that a spring-loaded pin and slot arrangement could be provided on the end of the bolt and its receiving bore in the mount to allow the bolt simply to be pushed in and rotated to its engaged position instead of being screwed in. The engagement mechanism does not change how the locking pin operates with the respect to locking the bolt in its engaged position.

The lip is an angled end surface of the leaf spring. In the preferred embodiment the angled end surface is directed toward the mount. The locking pin further includes a retaining wire coupling the bolt to the mount.

The illustrated embodiments also include a movable and lockable handle for a portable light. As described below, the light may also include the locking pin described above. The movable and lockable handle includes a hand grip, and a pair of arms extending from the hand grip. At least one of the pair of arms is manually and resiliently flexible, although in the illustrated embodiment both arms are equally manually and resiliently flexible. A pair of hinges are coupled to the light. The pair of arms are rotatably coupled to corresponding ones of the pair of hinges. At least one of the pair of hinges has a locking flange defined therein for securely capturing the resiliently flexible arm when the arm is disposed in a folded configuration. The resiliently flexible arm is capable of being manually flexed from an original form and moved out from behind the locking flange to allow the resiliently flexible arm to be rotated from the folded configuration to a fully deployed configuration.

The locking hinge has defined thereon a detent flange, and a shoulder extending between the detent flange and the locking flange to provide an edge on which the resiliently flexible arm rides from an edge of the locking flange onto the shoulder and to resiliently return to its original form as it is rotated to the fully deployed configuration and to become seated behind the detent flange.

The detent flange provides a resistance interference fit with the resiliently flexible arm to maintain the handle in the fully deployed configuration, but still allows manual rotation of the handle in the locking hinge from the fully deployed configuration toward the folded configuration upon the application of a predetermined manual torque to the handle.

The movable and lockable handle further includes a pair of identical handles provided for the light, each having a corresponding hand grip, pair of arms and pair of hinges, one handle of the pair of handles coupled to each side of the light.

The hand grip is molded to form an ergonomic finger grip.

The movable and lockable handle further includes a fingerhold defined in the resiliently flexible arm to facilitate manual engagement with the resiliently flexible arm to move it out from behind the locking flange of the locking hinge.

In the preferred embodiment only one of the pair of hinges comprises a locking hinge. However, if desired both of the pair of hinges could be configured as a locking hinge.

The movable and lockable handle further includes a receiving mount for a T-rail coupled to the light and where the pair of hinges are fixed to the mount.

The movable and lockable handle further includes a locking pin for the mount for receiving a T-rail. The locking pin can be provided in any one of the embodiments described above.

The movable and lockable handle may further include a mount coupled to the light and where the portable light comprises a search light capable of being mounted to a gun or vehicle.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The disclosure can be better visualized by turning now to the following drawings wherein like elements are referenced by like numerals.

The disclosure and its various embodiments can now be better understood by turning to the following detailed description of the preferred embodiments which are presented as illustrated examples of the embodiments defined in the claims. It is expressly understood that the embodiments as defined by the claims may be broader than the illustrated embodiments described below.

DETAILED DESCRIPTION OF THE PREFERRED EMBODIMENTS

Figure 1:
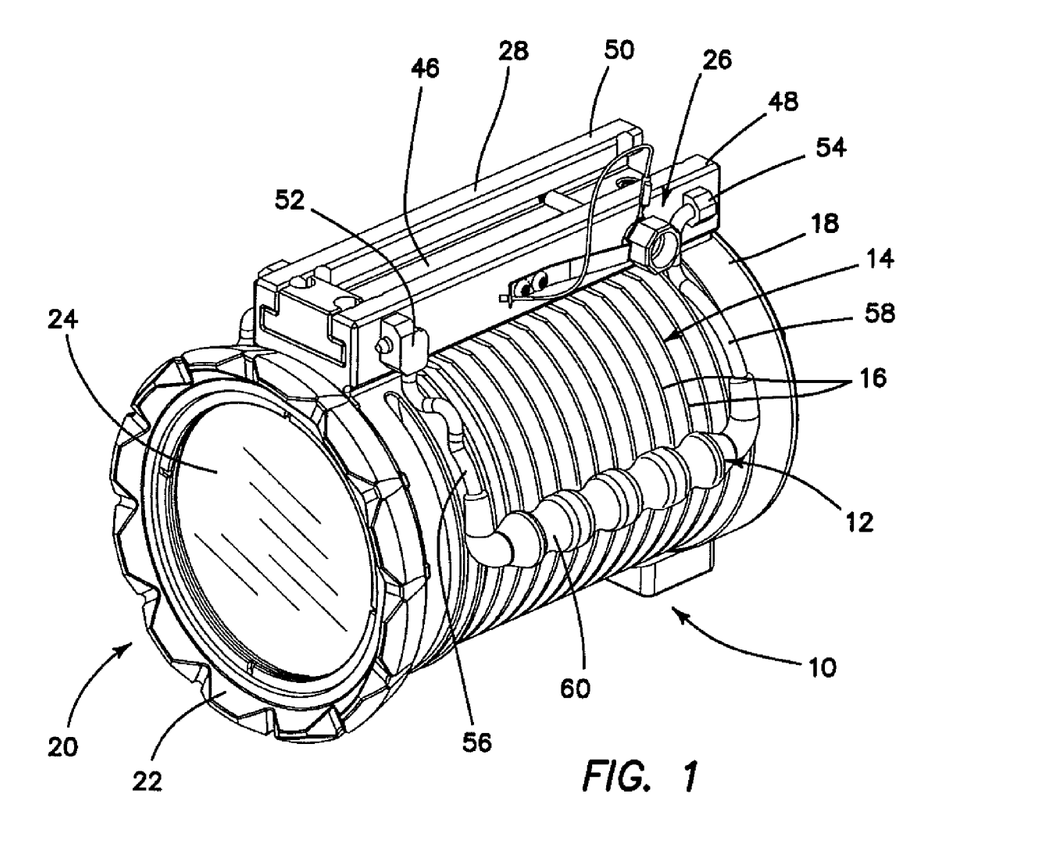
FIG. 1 is a perspective view of a portable search light having the handles and locking pin of the illustrated embodiments.

The illustrated embodiments of the invention include a lockable and movable pair of handles 12 for a portable light or search light 10. As an example, in the illustrated embodiment light 10 includes a cylindrical body 14 with a plurality of heat fins 16, rear end assembly 18 and front end assembly 20. Front end assembly 20 includes a front elastomeric bumper or shock absorber 22 and face plate 24. A female T-rail mount 26 is attached to the top of body 14 and is a proprietary receiving mounting 28 by with light 10 is engaged to a mating T-rail (not shown) that provided on a gun, vehicle, fixture or such other object to which it is desire to securely, temporarily fix light 10. Light 10 is illustratively an arc lamp which can be used to provide a collimated beam of light or infrared with a mile or more useful illuminating range typically used in military or law enforcement applications.

The particulars described above with respect to light 10 are provided only by way of example or background context and it is to be expressly understood that these particulars may be varied by any and all alternative design options or features without affecting the scope or sense of the invention disclosed below.

Figure 15:
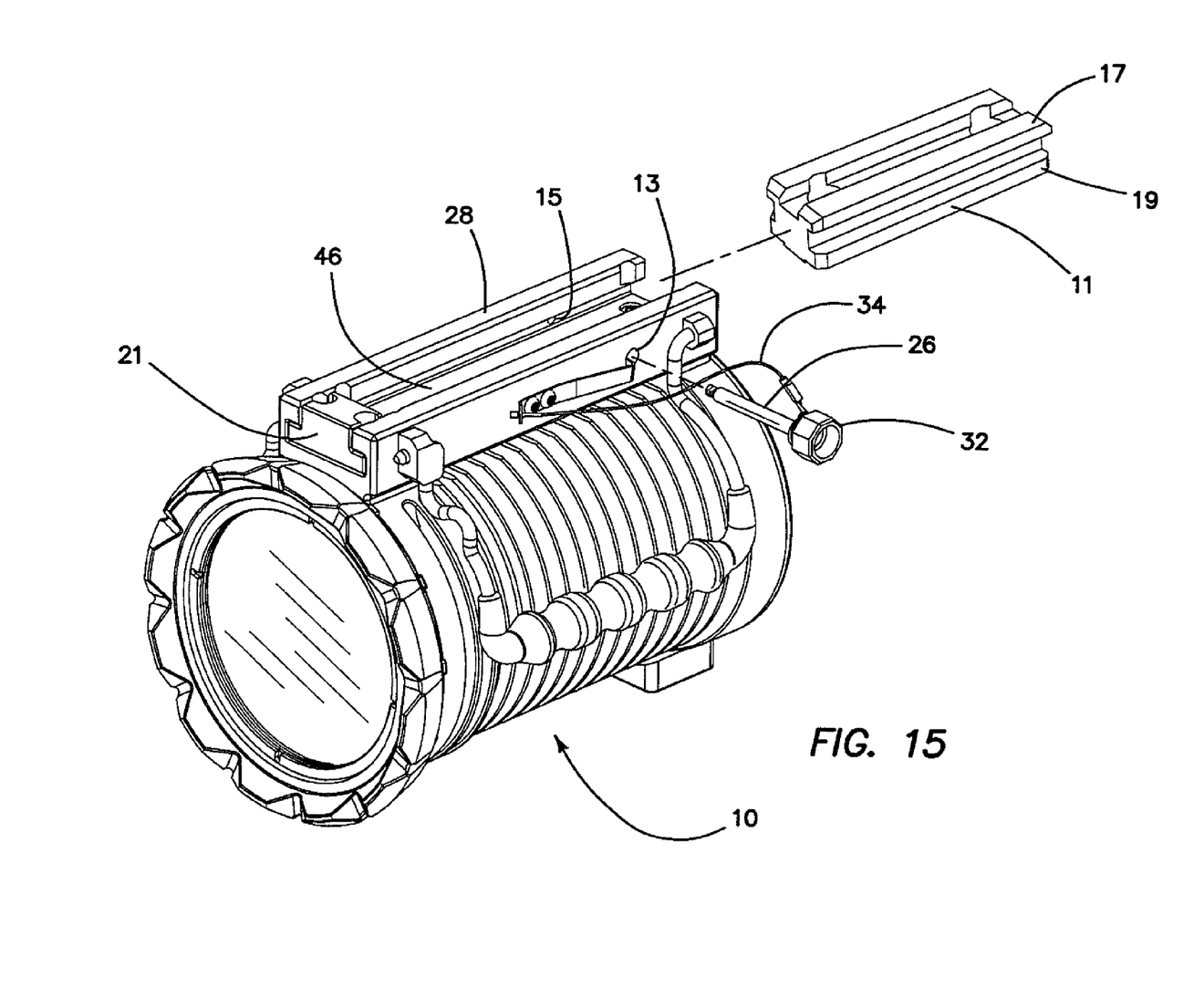
FIG. 15 is a perspective view of the light of FIG. 1 showing the T-rail which is insertable into the receiving mount and locked therein by the locking pin.
Figure 16:
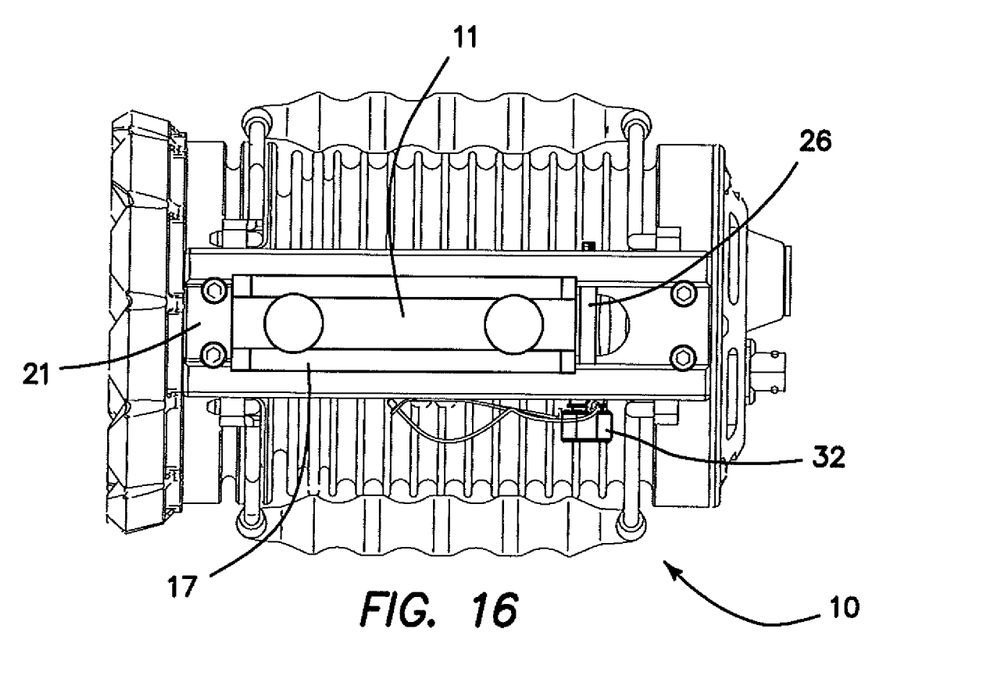
FIG. 16 is a top plan view of the light of FIG. 15 showing the T-rail locked into the receiving mount by the locking pin.
Figure 17:
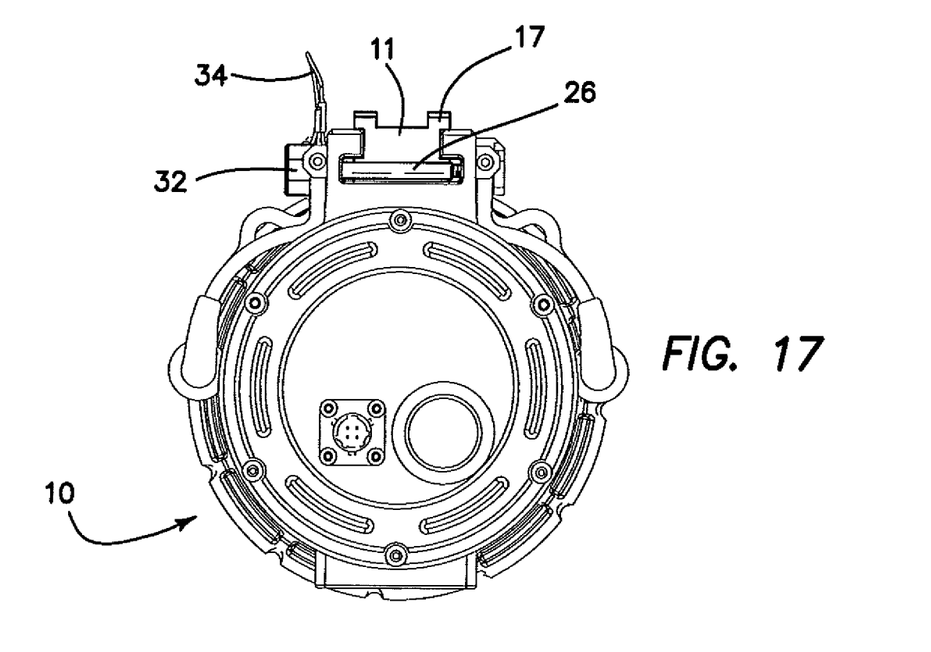
FIG. 17 is a rear plan view of the light of FIG. 16.

FIG. 15 is a perspective view of the light 10 of FIG. 1 showing the T-rail 11 which is insertable into the receiving mount 28 and locked therein by the locking pin 26. The illustrated T-rail 11 includes an upper rail 17 and lower rail 19 which slided in a mating relationship into channel 46 as best depicted in the rear plan view of FIG. 17. Locking pin 26 will be slidingly disposed through through-hole 13 and threaded into opposing threaded bore 15 best seen in FIG. 15 after T-rail 11 is disposed into channel 46. T-rail 11 is securely locked or fixed between locking pin 26 at its rear end and a front stop 21 fixed into mount 28 at the front end of channel 46 as best seen in FIG. 16, which is a top plan view of the light 10 of FIG. 15. T-rail 11 in turn is connected, coupled or fixed to an object which is intended to carry light 10, such as a machine gun or vehicle. It can readily be appreciated by viewing FIGS. 15-17 that light 10 can be quickly, easily and securely engaged or coupled to as well as disengaged or decoupled from T-rail 11 by use of locking pin 26 and mount 28.

Figure 2:
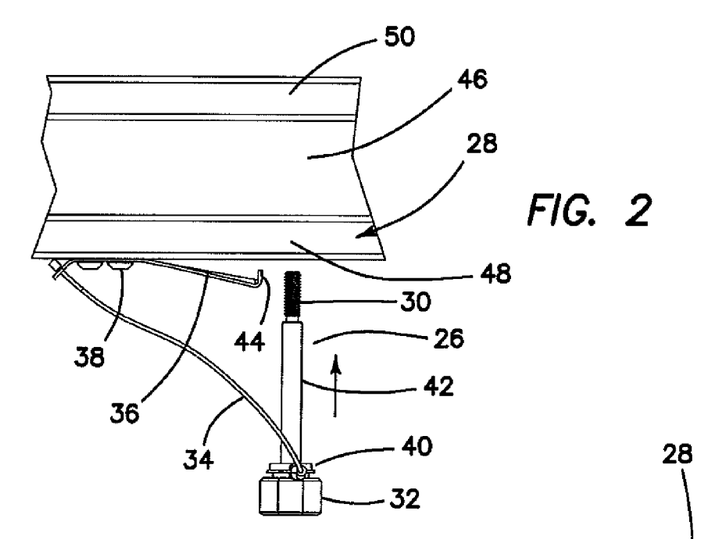
FIG. 2 is a partial cutaway top plan view in enlarged scale of that portion of the locking pin of FIG. 1 showing the locking pin pulled or disengaged from the T-rail into which it will be inserted.

Turn first to the locking pin 26 used to secure the Trail 11 in T-rail mount 28. Pin 26 will typically be disposed through a bore or slot defined in the T-rail so that the T-rail cannot be inadvertently removed or shaking loose from mount 28. In the illustrated embodiment as best depicted in FIG. 2 pin 26 is comprised of an elongated cylindrical body 42 with a threaded end 30 and an opposing head 32. By way of example, head 32 is an octagonal head, but a hexagonal or other faceted configuration could be equivalently employed. Pin 26 in the embodiment of FIG. 2 is also provided with a collar 40 to which a wire 34 is attached, the opposing end of which wire 34 is attached to mount 28, and in particular to an end of leaf spring 36, which in turn is fixed to mount 28 by means of rivets or fasteners 38. Resilient leaf spring 36 extends from its attachment to mount 28 toward the disposition position of pin 26 into mount 28 and is terminated by a flattened terminal lip 44, which is formed by bending the distal end of spring 36 back toward mount 28.

Figure 3:
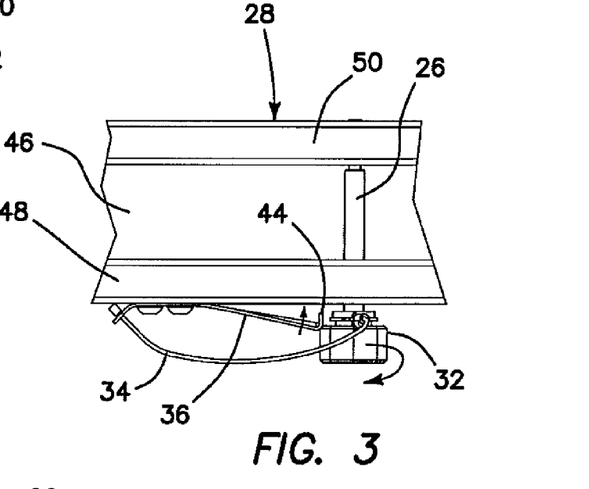
FIG. 3 is the partial cutaway top plan view of FIG. 2 where the locking pin has been inserted into the T-rail and has been partially rotated to begin engagement with the locking leaf spring.
Figure 4:
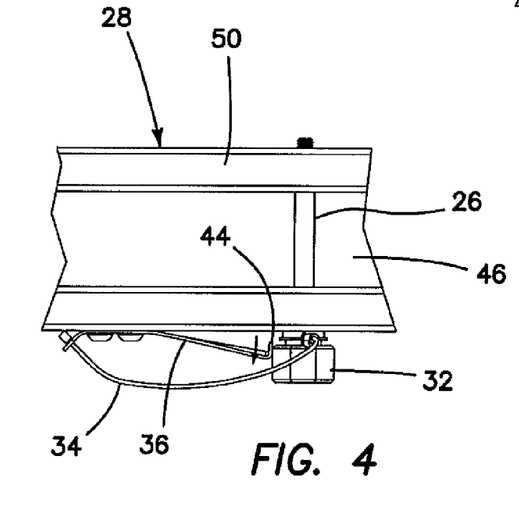
FIG. 4 is the partial cutaway top plan view of FIGS. 2 and 3 where the locking pin has been fully inserted into the T-rail and has been sufficiently rotated so that the locking leaf spring has been flexed and fully engaged a flat of the head of the locking pin.
Figure 5:
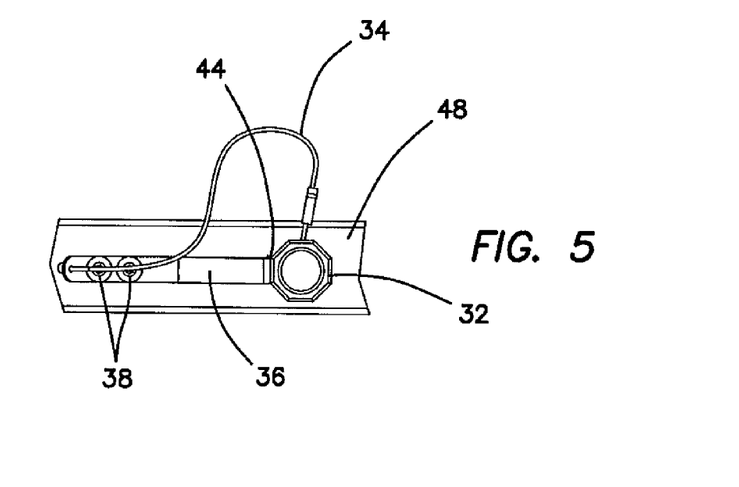
FIG. 5 is a partial cutaway side plan view of FIG. 4 where the locking pin has been fully inserted into the T-rail and locked.

Pin 26 is intended to be disposed in a through bore (not shown) defined in the upper wall 48 of mount 28 so that pin 26 is easily slid through the upper wall 48 of mount 28, across the open channel 46 through which the T-rail is disposed and into a threaded bore (not shown) defined in opposing wall 50 of mount 28. Pin 26 is then rotated in the threaded bore as shown in FIG. 3 drawing pin 26 and its head 32 toward wall 48 and the lip 44 of spring 36. As pin 26 is screwed into mount 28 the lower edge of head 32 will come into contact with lip 44, which is an angled distal planar surface of the spring 36. Lip 44 is angled backwardly toward the mount 28. The lower or most distal edge of lip 44 will thus be the most outwardly extending point on spring 36 and will come into contact with the head 32 as pin 26 is being screwed into mount 28. At first the contact between head 32 and lip 44 spring 36 is forced to flex and is depressed toward wall 48 of mount 28. The rotation of head 32 against lip 44 can be heard and/or felt as a clicking of lip 44 against the facets of head 32. As pin 26 continues to be rotated, spring 36 continues to be flexed inward toward wall 48 of mount 28 indicated by the counterclockwise arrow in FIG. 3 so that lip 44 begins to be rotated toward an orientation in which the planar surface of lip 44 moves closer to a parallel to the facets of head 32 as these facets are rotated. At some point the swing of lip 44 on leaf spring 36 changes the angle of orientation of the planar surface of lip 44 with respect to head 32 enough to create a clearance between lip 44 and a facet of head 32 as it is rotated. At this configuration or point, lip 44 is urged by spring 36 to be released from its compressed configuration and spring or rotate out or away from wall 48 of mount 28 as shown in FIG. 4 by the clockwise arrow. In this configuration, the flat of lip 44 will be juxtaposed against the flat of one of the facets of head 32. Head 32 can no longer be rotated as a result of the interference fit between the flat of lip 44 and the facet of head 32. Pin 26 is now locked into position and can no longer be rotated in or out. The locked configuration is robust so that even with significant or violent shaking, lip 44 and head 32 do not come out of their interference fit. Even if mount 22 is thus violently jolted as by a recoil of a heavy gun, pin 26 remains in position and the T-rail remains captured in mount 28, and hence light 10 remains securely fixed in its position on the gun.

Figure 6:
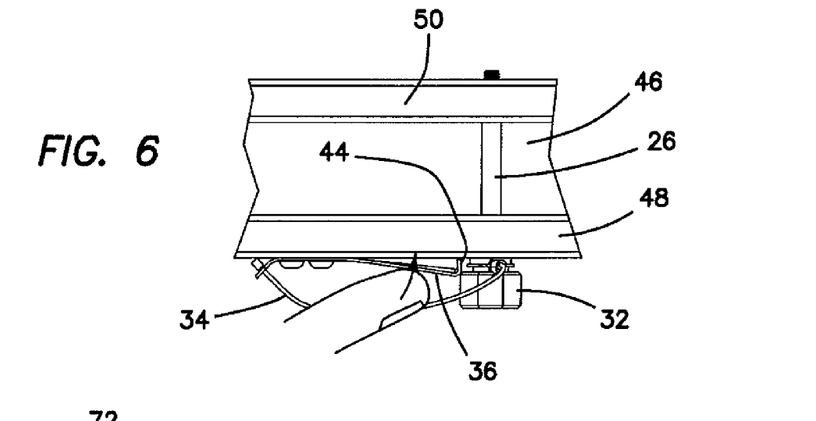
FIG. 6 is the partial cutaway top plan view of FIG. 5 where the locking leaf spring is manually force down out of engagement with the head of the locking pin allowing it to be rotated and removed from the T-rail.

However, when the time comes to disengage light 10 from its connection to the T-rail, it is done easily and quickly as shown in FIG. 6. Spring 36 is easily depressed manually by a finger of the operator moving the flat of lip 44 out of its interference fit with the adjacent facet of head 32. At this point, head 32 then be rotated and pin 26 unscrewed from mount 28 without difficulty. Pin 26 can be withdrawn from the through bore in wall 48 thereby allowing the T-rail to be slid out of channel 46 in mount 28. Pin 26 is retained in the general vicinity of mount 28 for its next use by means of wire 34.

Turn now and consider the movable and lockable handles 12 also connected by hinges 52 and 54 fixed to walls 48 and 50 of mount 28 as seen in FIG. 1. A pair of handles 12 are provided to light 10, one of which is clearly depicted in FIG. 1. The handle 12 on the opposing side of light 10 is identical to the one shown, so that it will be understood that the description of the illustrated handle 12 contemplates both handles 12 of the pair. Handle 12 has a front arm 56 in the vicinity of the front end 20 of light 10 and a rear arm 58 in the vicinity of the rear end 18 of light 10. The arms 56 and 58 could easily be reversed if desired, namely arm 56 and hinge 52 made the rear arm and hinge respectively and arm 58 and hinge 54 made the front arm and hinge respectively. Thus, a description of the embodiment of one configuration will be understood as including both possible embodiments. Between arms 56 and 58 is a hand grip 60, which is ergonomically molded to provide a conforming surface for gripping fingers. The upper ends of arms 56 and 58 are bent or formed to fit in pivot bores 62 defined in hinges 52 and 54 best seen in FIGS. 12 and 14.

Figures 7, 8:
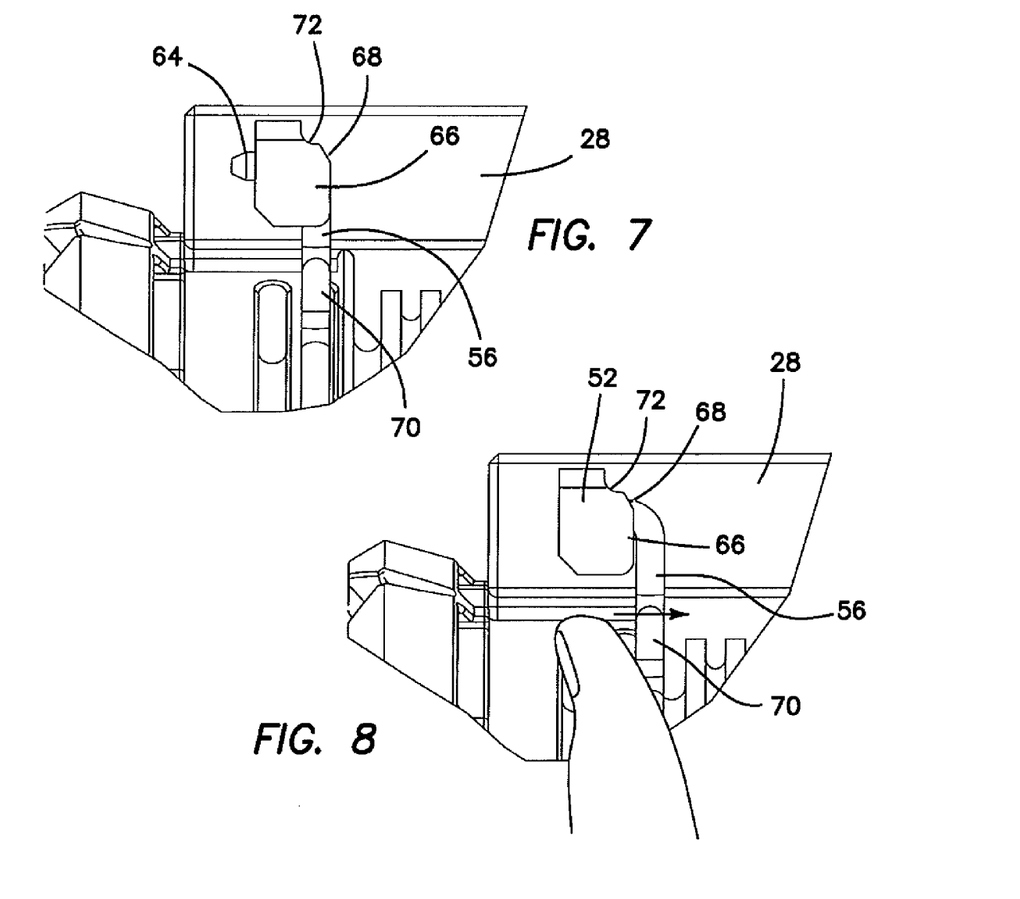
FIG. 7 is a partial cutaway side plan view of the forward hinge coupling of the handle to the T-rail with the handle shown in the down or folded configuration.
FIG. 8 is the partial cutaway side plan view of FIG. 7 where the forward arm of the handle with the handle shown in the down or folded configuration is manually compressed or flexed toward the rear of the light to disengage the arm from the forward hinge.
Figures 11, 12, 13, 14:
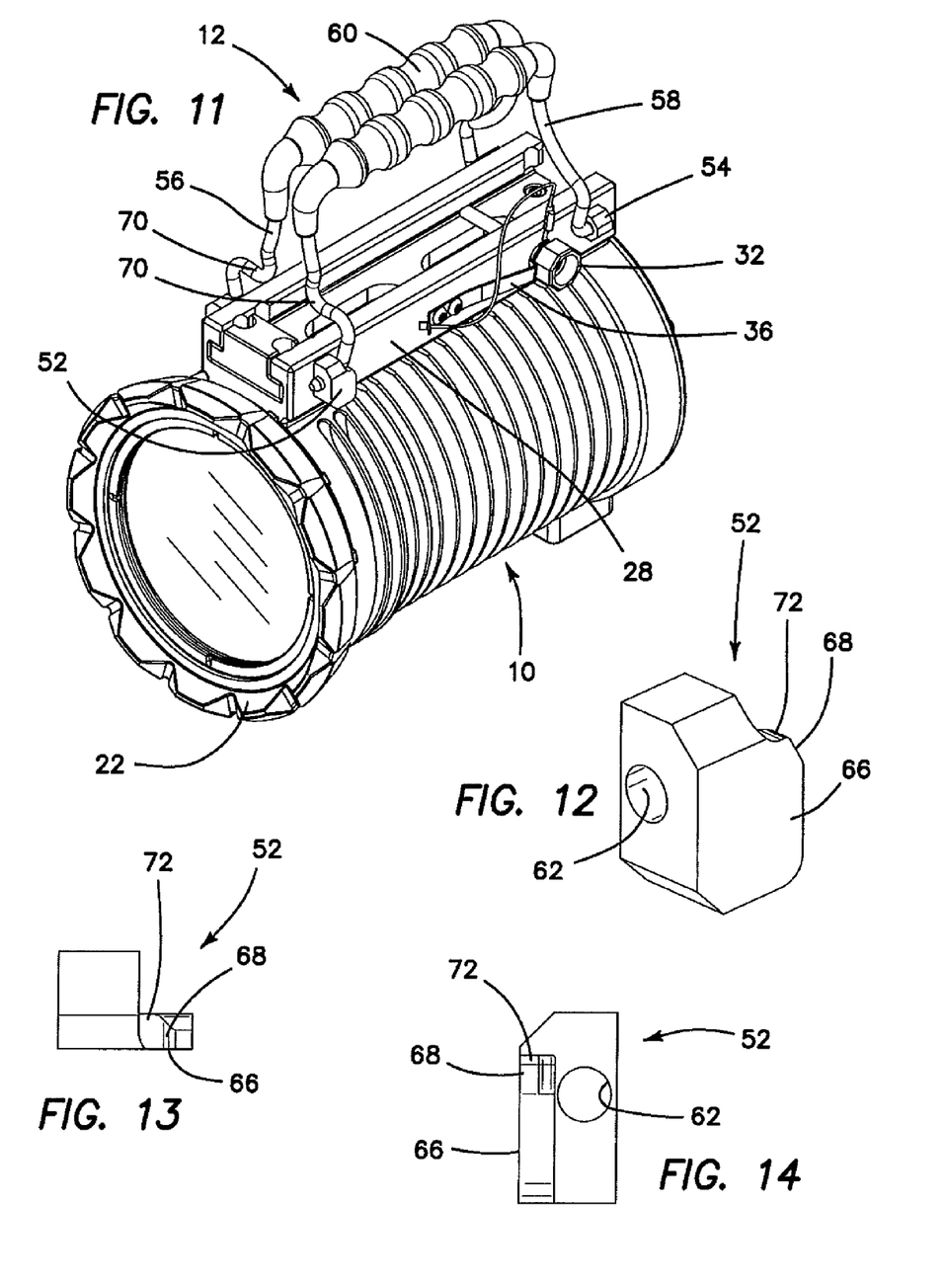
FIG. 11 is a perspective view of a portable search light having the handles rotated upward into the detent deployed configuration and the locking pin in the locked configuration.
FIG. 12 is perspective view in enlarged scale of the forward hinge shown in isolation of the other elements of the illustrated embodiment.
FIG. 13 is a top plan elevational view of the forward hinge of FIG. 12.
FIG. 14 is a rear plan elevational view of the forward hinge of FIG. 12.

The arms are in the down or folded configuration in FIG. 1 and in the up or deployed configuration in FIG. 11. Arms 12 rotate in hinges 52 and 54 between these two configurations. In the enlargement of FIG. 7 the upper end 64 of arm 56 is shown disposed in hinge 52 in the folded configuration. End 64 is disposed through bore 62 and the distal portion of arm 56 is behind flange 66 of hinge 52 as seen in FIG. 7. The upper top corner of flange 66 has a rounded or relieved shoulder 68 that slopes away forward toward the front of hinge 52. When distal portion of arm 56 is disposed behind flange 66 as seen in FIG. 7 it is locked in the folded configuration and cannot be rotated upward due the interference of flange 66.

Figure 10:
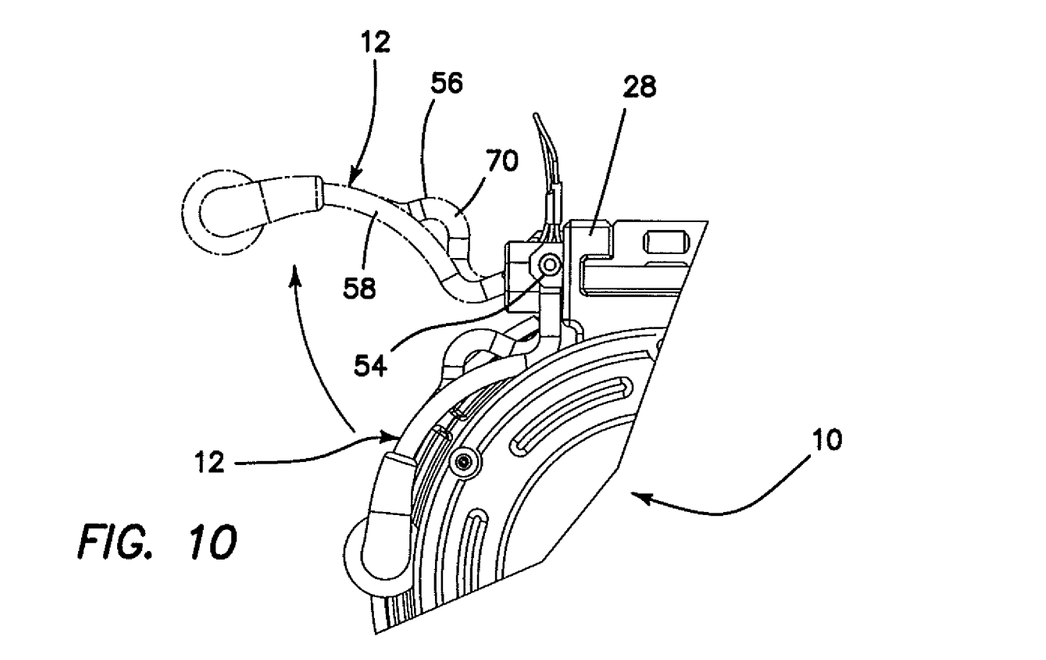
FIG. 10 is the partial cutaway rear plan view showing arms of the handle in solid outline in the locked down or folded configuration and then in dotted outline in a partially deployed or rotated up configuration.

However, when the distal portion of arm 56 is manually pushed rearward as shown in FIG. 8 as indicated by the rearward arrow, it unseats from behind or clears flange 66. When in this flexed position it can then be rotated up and outward from the body of light 10 as indicated from the clockwise arrow in FIG. 10. Arm 56 can be flexed by pushing rearwardly on arm 56 or by squeezing arms 56 and 58 together and toward the rear using one hand. To facilitate this flexing of arm 56, arm 56 is provided with a bent portion 70 as a fingerhold just below its distal portion as best shown in FIGS. 10 and 11. In the illustrated embodiment arm 58 has no such fingerhold, but it could be provided if desired. As soon as it rotated outward, the distal portion of arm 56 rides on the rear edge of flange 66 and can be manually released. Arm 56 will not reseat behind flange 66 when rotated outward and can continue to rotated upward and outward toward the deployed configuration of FIG. 11.

Figure 9:
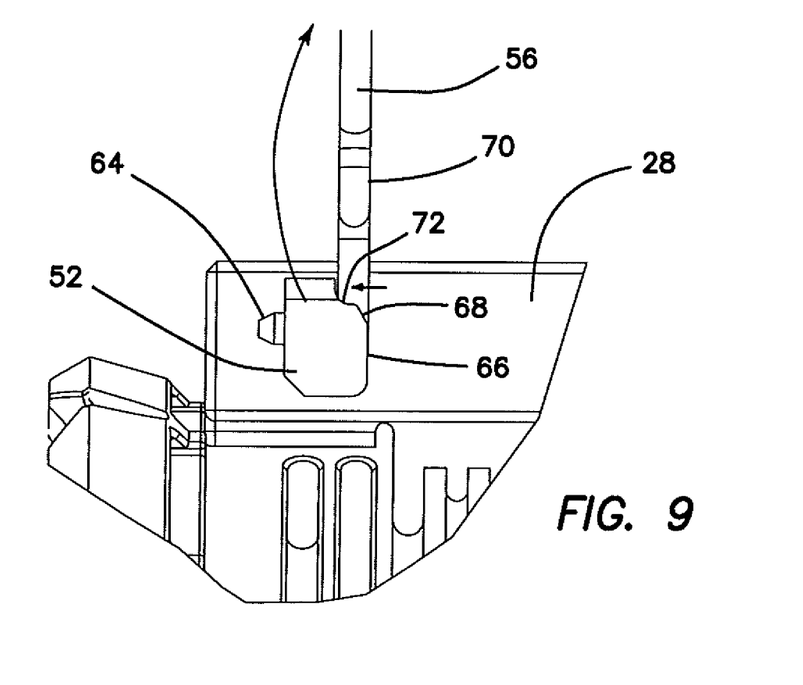
FIG. 9 is the partial cutaway side plan view of FIG. 8 where the forward arm of the handle has been rotated upward in the hinge to up or deployed configuration and has resiliently moved into a detent configuration in the forward hinge.

Enlarged perspective and plan views of hinge 52 and its various surfaces are best seen in FIGS. 12-14 and should be referenced with respect to the movement of the distal portion of arm 56 in hinge 52. At some point in its rotation, the distal portion of arm 56 will move the rear edge of flange 66 to the rear edge of shoulder 68 and will be allowed to return to its uncompressed original condition. This will allow the distal portion of arm 56 snap into the fully expanded condition and fully deployed configuration as distal end 64 is allowed to telescope forward into bore 62 and assume the position of FIG. 9. When in the fully deployed configuration as seen in FIG. 9, just above and forward of shoulder 68 is provided a curved or sloping detent edge 72. A partial interference fit is provided between detent edge 72 and the distal portion of arm 52. There is sufficient interference such that arm 12 is prevented from rotating downward from the up or deployed configuration by gravity or weight of the arms 12. However, if the user grasps arm 12 and forces it against the resistance of flexure of arm 56 to rotate downwardly, the distal portion of arm 56 will ride up and over detent edge 72 causing the distal portion of arm 56 to flex rearwardly. This initial resistance, but ultimate compliance of arm 56 to a downward rotation, gives the movement of arm 12 in hinge 52 a detent action when moved from the deployed configuration toward the folded configuration. As arm 12 is continued to be manually forced down, it will then cause the distal portion of arm 56 will ride up and over the rear edge of shoulder 68 and finally the rear edge of flange 66. When arm 12 is fully rotated down, it will slip off the rear edge of flange 66 and expand or snap into its original expanded shape behind flange 66, returning to the locked configuration of FIG. 7.

In the illustrated embodiment only forward hinge 52 is provided with the locking flange 66, shoulder 68 and detent edge 72. Rear hinge 54 is provided as a simple block with a pivot bore defined therethrough. However, it is entirely within the scope of the invention that the locking flange 66, shoulder 68 and detent edge 72 could be provided in rear hinge 54 instead or in both the forward and rear hinges 52 and 54 respectively.

Further, hinges 52 and 54 and hence arms 12 are shown coupled or connected to mount 28, but it is also within the scope of the invention that hinges 52 and 54 could be coupled or connected to the body 14 or some other part of light 10.

Note should be made that handles 12 are provided by the illustrated embodiment with a robust and positive temporary lock in the folded or down position. When the light 10 is coupled to a gun or vehicle, for example, the handles 12 cannot fly upward or away from the body 14 of light 10 even when shaken by violent shocks or the recoils of a heavy gun. However, when light 10 is removed from the gun or vehicle for portable handheld use, the handles 12 are easily unlocked without any special tools or difficult manipulation of a locking mechanism. A detent mechanism allows the handles 12 to remain in the up or deployed configuration for ease of grasping or carrying without any special or difficult manipulation by the user, but still allows the handles 12 to be easily folded down and locked for more compact stowage if preferred.

Many alterations and modifications may be made by those having ordinary skill in the art without departing from the spirit and scope of the embodiments. Therefore, it must be understood that the illustrated embodiment has been set forth only for the purposes of example and that it should not be taken as limiting the embodiments as defined by the following embodiments and its various embodiments.

Therefore, it must be understood that the illustrated embodiment has been set forth only for the purposes of example and that it should not be taken as limiting the embodiments as defined by the following claims. For example, notwithstanding the fact that the elements of a claim are set forth below in a certain combination, it must be expressly understood that the embodiments includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the embodiments is explicitly contemplated as within the scope of the embodiments.

The words used in this specification to describe the various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the embodiments.

I claim:

1. A locking pin for a mount for receiving a T-rail comprising:
    a bolt for disposition into and engagement with the mount for capturing the T-rail in the mount;
    a plurality of facets defined on the bolt; and
    a locking leaf spring having a first end fixed to the mount and a second distal end with a planar lip, where the bolt contacts the lip and depresses the leaf spring as the bolt is advanced into the mount until the lip and one of the plurality of facets have sufficient clearance between the facet and lip to allow the leaf spring to clear the bolt, the leaf spring then being released so that the lip and facet are juxtaposed parallel to each other and in an interference fit preventing further rotation of the bolt and hence preventing the bolt from being removed from the mount.

2. The locking pin of claim 1 where the bolt has an octagonal bolt head on which the plurality of facets are defined.

3. The locking pin of claim 1 where the bolt is threaded and a threaded bore hole is defined in the mount for receiving the bolt.

4. The locking pin of claim 1 where the lip is angled end surface of the leaf spring.

5. The locking pin of claim 4 where the angled end surface is directed toward the mount.

6. The locking pin of claim 1 further comprising a retaining wire coupling the bolt to the mount.

7. A movable and lockable handle for a portable light comprising:
    a hand grip;
    a pair of arms extending from the hand grip, at least one of the pair of arms being manually and resiliently flexible; and
    a pair of hinges coupled to the light, the pair of arms being rotatably coupled to corresponding ones of the pair of hinges, at least one of the pair of hinges having a locking flange defined therein for securely capturing the resiliently flexible arm when the arm is disposed in a folded configuration, the resiliently flexible arm capable of being manually flexed from an original form and moved out from behind the locking flange to allow the resiliently flexible arm to be rotated from the folded configuration to a fully deployed configuration.

8. The movable and lockable handle of claim 7 where the locking hinge has defined thereon a detent flange, and a shoulder extending between the detent flange and the locking flange to provide an edge on which the resiliently flexible arm rides from an edge of the locking flange onto the shoulder and to resiliently return to its original form as it is rotated to the fully deployed configuration and to become seated behind the detent flange.

9. The movable and lockable handle of claim 8 where the detent flange provides a resistance interference fit with the resiliently flexible arm to maintain the handle in the fully deployed configuration, but to allow manual rotation of the handle in the locking hinge from the fully deployed configuration toward the folded configuration upon the application of a predetermined manual torque to the handle.

10. The movable and lockable handle of claim 7 further comprising a pair of identical handles provided for the light, each having a corresponding hand grip, pair of arms and pair of hinges, one handle of the pair of handles coupled to each side of the light.

11. The movable and lockable handle of claim 7 where the hand grip is molded to form an ergonomic finger grip.

12. The movable and lockable handle of claim 7 further comprising a fingerhold defined in the resiliently flexible arm to facilitate manual engagement with the resiliently flexible arm to move it out from behind the locking flange of the locking hinge.

13. The movable and lockable handle of claim 7 where only one of the pair of hinges comprises a locking hinge.

14. The movable and lockable handle of claim 7 where both of the pair of hinges comprises a locking hinge.

15. The movable and lockable handle of claim 7 further comprising a receiving mount for a T-rail coupled to the light and where the pair of hinges are fixed to the mount.

16. The movable and lockable handle of claim 15 further comprising a locking pin for the mount for receiving a T-rail.

17. The movable and lockable handle of claim 16 where the locking pin comprises:

a bolt for disposition into and engagement with the mount for capturing the T-rail in the mount;
a plurality of facets defined on the bolt; and
a locking leaf spring having a first end fixed to the mount and a second distal end with a planar lip, where the bolt contacts the lip and depresses the leaf spring as the bolt is advanced into the mount until the lip and one of the plurality of facets have sufficient clearance between the facet and lip to allow the leaf spring to clear the bolt, the leaf spring then being released so that the lip and facet are juxtaposed parallel to each other and in an interference fit preventing further rotation of the bolt and hence preventing the bolt from being removed from the mount.

18. The locking pin of claim 17 where the lip is an angled end surface of the leaf spring.

19. The locking pin of claim 18 where the angled end surface is directed toward the mount.

20. The movable and lockable handle of claim 7 further comprising a mount coupled to the light and where the portable light comprises a search light capable of being mounted to a gun or vehicle.

* * * * *